(12) United States Patent
Milam et al.

(10) Patent No.: US 9,404,344 B2
(45) Date of Patent: *Aug. 2, 2016

(54) REMEDIATION OF ASPHALTENE-INDUCED PLUGGING OF WELLBORES AND PRODUCTION LINES

(71) Applicant: SHELL OIL COMPANY, Houston, TX (US)

(72) Inventors: Stanley Nemec Milam, Houston, TX (US); Erik Willem Tegelaar, Rijswijk (NL); John Justin Freeman, Pattison, TX (US); Richard B. Taylor, Sugar Land, TX (US)

(73) Assignee: Shell Oil Company, Houston, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 14/315,054

(22) Filed: Jun. 25, 2014

(65) Prior Publication Data

US 2015/0000915 A1     Jan. 1, 2015

Related U.S. Application Data

(60) Provisional application No. 61/840,089, filed on Jun. 27, 2013.

(51) Int. Cl.
| | |
|---|---|
| *E21B 21/14* | (2006.01) |
| *E21B 37/06* | (2006.01) |
| *C09K 8/524* | (2006.01) |

(52) U.S. Cl.
CPC ............... *E21B 37/06* (2013.01); *C09K 8/524* (2013.01); *E21B 21/14* (2013.01)

(58) Field of Classification Search
CPC .......... E21B 43/22; E21B 37/00; E21B 43/25; E21B 37/08; E21B 41/02; E21B 28/00; E21B 37/06; E21B 21/14; E21B 43/162; C10G 1/04; C10G 47/06; C10G 47/00; C09K 8/524; C09K 8/58
USPC .................................................... 166/304, 77
See application file for complete search history.

(56) References Cited

U.S. PATENT DOCUMENTS

| | | | |
|---|---|---|---|
| 1,514,113 | A | 11/1924 | Trumble |
| 3,249,157 | A | 5/1966 | Brigham et al. |
| 3,467,187 | A | 9/1969 | Gogarty et al. |
| 3,570,601 | A | 3/1971 | Dauben et al. |
| 3,822,748 | A | 7/1974 | Allen et al. |

(Continued)

FOREIGN PATENT DOCUMENTS

| | | |
|---|---|---|
| CA | 1209077 A1 | 8/1986 |
| CN | 102132003 | 7/2011 |

(Continued)

OTHER PUBLICATIONS

International Search Report dated Oct. 20, 2014 of PCT/US2014/044026 filed Jun. 25, 2014.

(Continued)

*Primary Examiner* — Zakiya W Bates
(74) *Attorney, Agent, or Firm* — Richard B. Taylor

(57) ABSTRACT

A method of treating a wellbore penetrating a subterranean formation comprising: providing an asphaltene solvent, wherein the asphaltene solvent comprises at least 75 mol % dimethyl sulfide and introducing the asphaltene solvent into the wellbore.

16 Claims, 3 Drawing Sheets

(56) References Cited

U.S. PATENT DOCUMENTS

| | | | |
|---|---|---|---|
| 3,838,738 | A | 10/1974 | Redford et al. |
| 4,022,277 | A | 5/1977 | Routson |
| 4,250,963 | A | 2/1981 | Hess |
| 4,280,559 | A | 7/1981 | Best |
| 4,302,605 | A | 11/1981 | Buchholz et al. |
| 4,347,118 | A | 8/1982 | Funk et al. |
| 4,348,486 | A | 9/1982 | Calvin et al. |
| 4,379,490 | A | 4/1983 | Sharp |
| 4,414,120 | A | 11/1983 | Malloy et al. |
| 4,415,032 | A | 11/1983 | Shu |
| 4,486,340 | A | 12/1984 | Glass, Jr. |
| 4,544,033 | A | 10/1985 | Ukigai et al. |
| 4,572,777 | A | 2/1986 | Peck |
| 4,580,633 | A | 4/1986 | Watkins et al. |
| 4,584,087 | A | 4/1986 | Peck |
| 4,699,709 | A | 10/1987 | Peck |
| 4,722,782 | A | 2/1988 | Graham et al. |
| 4,867,256 | A | 9/1989 | Snead |
| 5,043,056 | A | 8/1991 | Pratt et al. |
| 5,044,435 | A | 9/1991 | Sperl et al. |
| 5,143,598 | A | 9/1992 | Graham et al. |
| 5,211,231 | A | 5/1993 | Shu et al. |
| 5,232,049 | A | 8/1993 | Christiansen et al. |
| 5,425,422 | A | 6/1995 | Jamaluddin et al. |
| 6,662,872 | B2 | 12/2003 | Gutek et al. |
| 6,708,759 | B2 | 3/2004 | Leaute et al. |
| 7,691,320 | B2 | 4/2010 | Heinrich et al. |
| 8,176,982 | B2 | 5/2012 | Gil et al. |
| 2003/0130360 | A1 | 7/2003 | Kindig et al. |
| 2003/0196816 | A1 | 10/2003 | Aronstam |
| 2006/0219409 | A1 | 10/2006 | Dyer |
| 2008/0020949 | A1 | 1/2008 | Trimble et al. |
| 2008/0263953 | A1 | 10/2008 | Okada et al. |
| 2009/0020289 | A1 | 1/2009 | Sharif |
| 2009/0025935 | A1 | 1/2009 | Van Dorp et al. |
| 2009/0056941 | A1 | 3/2009 | Valdez |
| 2009/0236899 | A1 | 9/2009 | Geisler |
| 2010/0047793 | A1 | 2/2010 | Toledo et al. |
| 2010/0065275 | A1* | 3/2010 | McGowen et al. ............ 166/304 |
| 2010/0130386 | A1 | 5/2010 | Chakrabarty |
| 2011/0009556 | A1 | 1/2011 | Faust, Jr. et al. |
| 2011/0108269 | A1 | 5/2011 | Van Den Berg et al. |
| 2011/0132617 | A1 | 6/2011 | Wang |
| 2011/0146979 | A1 | 6/2011 | Wallace |
| 2011/0272325 | A1 | 11/2011 | Soane et al. |
| 2011/0295771 | A1 | 12/2011 | Dawson et al. |
| 2012/0037363 | A1 | 2/2012 | Curole |
| 2012/0138316 | A1 | 6/2012 | Matzakos |
| 2012/0152570 | A1 | 6/2012 | Thomas |
| 2012/0227975 | A1 | 9/2012 | Ayirala |
| 2012/0241150 | A1 | 9/2012 | Al Yahyai et al. |

FOREIGN PATENT DOCUMENTS

| | | |
|---|---|---|
| EP | 2225343 | 6/2011 |
| WO | 2010009115 | 1/2010 |
| WO | 2011019632 | 2/2011 |
| WO | 2011021092 A2 | 2/2011 |
| WO | 2012158645 | 11/2012 |
| WO | 2014004480 | 1/2014 |
| WO | 2014004485 | 1/2014 |
| WO | 2014004490 | 1/2014 |
| WO | 2014004495 | 1/2014 |
| WO | 2014004502 | 1/2014 |

OTHER PUBLICATIONS

Graham, R.J., et al.: A Solvent Extraction Process for Tar Sand, 1987 Eastern OH Shale Symposium, Commonwealth of Kentucky, Kentucky Energy Cabinet, pp. 93-99 (1987).

Kamidate, T., et. al.: The Removal and Recovery of Organic Sulfur Compounds from Petroleum Hydrocarbons by Liquid-Liquid Extraction. The Effect of Halogenide Ligands on the Rate of Sulfide Extraction with Transition Metal Complexes, vol. 74, No. 7 A63, pp. 1407-1410 (Jul. 1971).

Luataty, R., et al.: Flow Dynamics for Dense Packing of Drops in a Spray Column. Effect of the Viscosity of the Two Fluids, Chem. Eng. Sci. V. 27 No. 4, pp. 669-676 (Apr. 1972).

Yotsuyanagi, Takao et al., "Studies on the Removal & Recovery of Organic Sulfur Compounds in Hydrocarbon Oils by Liquid-Liquid Extraction(IV)"—The Solvent Extraction of Tetrahydrothiophene with Aqueous Bromo-Copper(II) Complex Solutions—, Bulletin of the Japan Petroleum Institute, vol. 17, No. 1, Apr. 1975, pp. 108-113.

"Molecular modeling the microstructure and phase behavior of bulk and inhomogeneous complex fluids", Adam Bymaster, Rice University, UMI No. 3362135. 2009.

"Flow Dynamics for Dense Packing of Drops in a Spray Column. Effect of the Viscosity of the Two Fluids", M. Perrut et al., Chem. Eng. Sci. V. 27 No. 4, pp. 669-676 (Apr. 1972).

"The Removal and Recovery of Organic Sulfur Compounds from Petroleum Hydrocarbons by Liquid-Liquid Extraction. The Effect of Halogenide Ligands on the Rate of Sulfide Extraction with Transition Metal Complexes", T. Kamidate, K. Aomura, T. Yotsuyanagi; Kogyo Kagaku Zasshi, vol. 74, No. 7 A63, pp. 1407-1410 (Jul. 1971).

"Characterization of Trace Gases Measured Over Alberta Oil Sands Mining Operations: 76 Speciated C2-C10 Volatile Organic Compounds (VOCs), CO2, CH4, CO, NO, NO2, O3, and SO2", Atmospheric Chemistry and Physics, I.J. Simpson et al, 10, 11931-11954, 2010.

Girish et al., Flexicoking-Coking and Integrated Steam/Air Gasification, 8th Annual Canadian Oil Sands Summit, Calgary, Alberta, Canada, Feb. 2-3, 2011.

Upgrading Petroleum Residues and Heavy Oils, Murray Gray, pp. 246-252 Marcel Dekker (1994).

Gaylord Chemical Co. LLC, Dimethyl Sulfide Overview, Bulletin #2008, published Oct. 2007, pp. 1-11.

Gaylord Chemical, Material Safety Data Sheet, "Dimethyl Sulfide (DMS)", Sep. 29, 2010, pp. 1-29.

Gray, M. et al., Upgrading Petroleum Residues & Heavy Oils, Chapter 6, pp. 246-252, Marcel Dekker, 1994.

Iliuta, M. C. et al., Solubility of Total Reduced Sulfurs (Hydrogen Sulphide, Methyl Mercaptan, Dimethyl Sulphide & Dimethyl Disulfide) in Liquids, Journal of Chemical & Engineering Date, American Chemical Society, US, vol. 52, No. 1, 2007, pp. 2-19.

* cited by examiner

REMEDIATION OF ASPHALTENE-INDUCED PLUGGING OF WELLBORES AND PRODUCTION LINES

RELATED CASES

This application claims benefit of U.S. Provisional Application No. 61/840,089, filed on Jun. 27, 2013, which is incorporated herein by reference.

FIELD OF THE INVENTION

The present disclosure relates generally to solvents useful for remediating asphaltene deposits in wellbores and production lines. More specifically, in certain embodiments, the present disclosure relates to dimethyl sulfide solvents useful for remediating asphaltene deposits in wellbores and production lines and associated methods.

BACKGROUND OF THE INVENTION

One of the problems encountered in the production of crude petroleum is the accumulation and deposition of asphaltenes in the wellbore and production lines. Asphaltenes may deposit in the wellbore and the production lines in the form of a solid deposit or a sludge. Solid deposits of asphaltenes may be a result of growth of asphaltene aggregates on formation surfaces, while sludges may form as large aggregates suspended in crude petroleum that settle out of the suspension.

The asphaltic materials which compose the deposits may originally be in solution in the crude oil as it exists in the reservoir. Often times in the production or transporting of crude petroleums, the equilibrium of the solution is altered or destroyed and these asphaltic materials, being the least soluble constituents, separate and accumulate in the wellbore and in production equipment at locations where the flow velocity is less than that required to maintain the asphaltene aggregates in suspension. Formation of asphaltenes deposits may also be exacerbated by interruptions in formation fluid flow through wellbores and production lines, such as the interruptions caused by routine maintenance and/or preparations for extreme weather such as hurricanes. The accumulation of these asphaltic materials progressively decreases the rate of movement of the petroleum and must therefore be periodically removed.

Various solvents have been utilized to solubilize asphaltenes that have deposited in oil-bearing formations. U.S. Pat. No. 5,425,422 discloses injecting deasphalted oil into an oil-bearing formation to solvate asphaltene deposits near a wellbore in the formation and thereby improving production of oil from the formation. The injected oil may be produced from the formation and deasphalted prior to being injected into the formation. The use of aromatic solvents such as o-xylene and toluene to dissolve asphaltene-based deposits in a formation near a wellbore is also known.

Disulfide solvents have also been used to dissolve asphaltene-based deposits in a formation for near-wellbore formation remediation. U.S. Pat. No. 4,379,490 discloses the use of an amine activated disulfide oil for treating and removing unwanted asphaltene deposits from the pore spaces of oil-bearing formations. U.S. Pat. No. 4,379,490 further discloses that carbon disulfide is one of the most effective asphaltene solvents known, and that it has been utilized for the removal of asphaltene-based deposits from oil-bearing formations.

Such solvents, however, have certain disadvantages attached to them. Injection of aromatics such as toluene and o-xylene may be subject to regulatory limitation, and is economically inefficient since such aromatics are even more highly processed and valuable than deasphalted oil. Disulfide solvents may be subject to hydrolysis within the formation, and, in the case of carbon disulfide, may result in souring the formation. Carbon disulfide is also highly toxic.

It is desirable to develop an improved method of remediating asphaltene deposits in wellbores and production lines.

SUMMARY OF THE INVENTION

The present disclosure relates generally to solvents useful for remediating asphaltene deposits in wellbores and production lines. More specifically, in certain embodiments, the present disclosure relates to dimethyl sulfide solvents useful for remediating asphaltene deposits in wellbores and production lines and associated methods.

In one embodiment, the present disclosure provides a method of treating a wellbore penetrating a subterranean formation comprising: providing an asphaltene solvent, wherein the asphaltene solvent comprises at least 75 mol % dimethyl sulfide and introducing the asphaltene solvent into the wellbore.

In another embodiment, the present disclosure provides a method of treating a production flow line from a wellbore penetrating a subterranean formation comprising: providing an asphaltene solvent, the asphaltene solvent comprising at least 75 mol % dimethyl sulfide and introducing the asphaltene solvent into the production flow line.

In another embodiment, the present disclosure provides a system for remediating asphaltene deposition comprising: an asphaltene solvent comprising at least 75 mol % dimethyl sulfide; an asphaltene solvent storage facility containing at least a portion of the asphaltene solvent; and a wellbore penetrating into an oil-bearing formation, wherein the asphaltene solvent storage facility is operatively fluidly coupled to the wellbore or production flow line from the wellbore.

BRIEF DESCRIPTION OF THE DRAWINGS

A more complete and thorough understanding of the present embodiments and advantages thereof may be acquired by referring to the following description taken in conjunction with the accompanying drawings.

Figure 1:
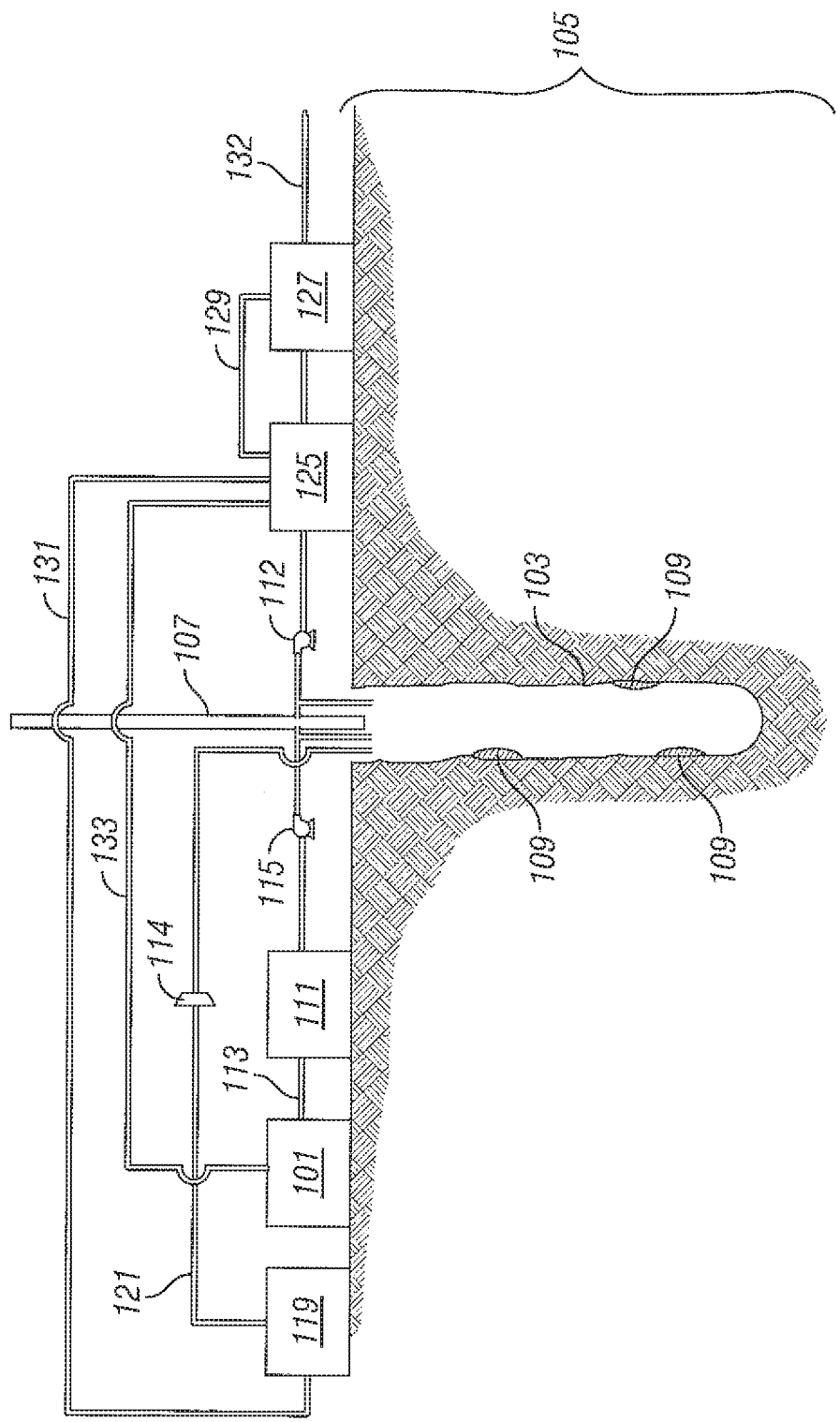
FIG. 1 is a schematic diagram illustrating a system of the present invention that may be utilized to practice a method of the present invention.

The features and advantages of the present disclosure will be readily apparent to those skilled in the art. While numerous changes may be made by those skilled in the art, such changes are within the spirit of the invention.

DETAILED DESCRIPTION

The present disclosure relates generally to solvents useful for remediating asphaltene deposits in wellbores and production lines. More specifically, in certain embodiments, the present disclosure relates to dimethyl sulfide solvents useful for remediating asphaltene deposits in wellbores and production lines and associated methods.

The description that follows includes exemplary apparatuses, methods, techniques, and instruction sequences that embody techniques of the inventive subject matter. However, it is understood that the described embodiments may be practiced without these specific details.

It has been discovered that dimethyl sulfide is miscible with all fractions of crude oil except solid paraffin waxes, and in particular, that dimethyl sulfide is a highly effective asphaltene solvent. An asphaltene solvent comprising at least 75 mol % dimethyl sulfide is provided, and is introduced into a wellbore or a production line comprising one or more asphaltene deposits. The solvent is contacted with the asphaltenes of the asphaltene deposits to solvate the deposited asphaltenes. The solvent may solvate a substantial portion of the asphaltenes in the asphaltene deposits to remove or reduce blockages in wellbores or production flow lines.

Dimethyl sulfide exhibits miscibility with asphaltenes similar to carbon disulfide. DMS, however, is relatively non-toxic, is not subject to hydrolysis at typical temperatures within oil-bearing formations, and may be produced from relatively low value components. DMS also has a low boiling point relative to most components of a crude oil, and may be easily separated from oil produced from the formation by flashing or distillation.

Certain terms used herein are defined as follows:

"Asphaltenes," as used herein, are defined as hydrocarbons that are insoluble in n-heptane and soluble in toluene at standard temperature and pressure.

"Miscible," as used herein, is defined as the capacity of two or more substances, compositions, or liquids to be mixed in any ratio without separation into two or more phases at equilibrium.

"Operatively fluidly coupled" or "operatively fluidly connected," as used herein, defines a connection between two or more elements in which the elements are directly or indirectly connected to allow direct or indirect fluid flow between the elements. The term "fluid flow," as used herein, refers to the flow of a gas or a liquid; the term "direct fluid flow" as used in this definition means that the flow of a liquid or a gas between two defined elements flows directly between the two defined elements; and the term "indirect fluid flow" as used in this definition means that the flow of a liquid or a gas between two defined elements may be directed through one or more additional elements to change one or more aspects of the liquid or gas as the liquid or gas flows between the two defined elements. Aspects of a liquid or a gas that may be changed in indirect fluid flow include physical characteristics, such as the temperature or the pressure of a gas or a liquid; the state of the fluid between a liquid and a gas; and/or the composition of the gas or liquid. "Indirect fluid flow," as defined herein, excludes changing the composition of the gas or liquid between the two defined elements by chemical reaction, for example, oxidation or reduction of one or more elements of the liquid or gas.

There may be several potential advantages of the methods discussed herein over conventional methods. One potential advantage of the methods discussed herein is that they may allow for the remediation of asphaltene deposits in wellbores and production flow lines without the use of costly solvents that may be subject to strict regulatory limitations. Another potential advantage of the methods discussed herein is that they may allow for the remediation of asphaltene deposits in wellbores and production flow lines without souring the formation. Another potential advantage of the methods discussed herein is that the low boiling point of DMS may permit it to be separated at a receiving facility and exported for recycle to the one or more injection locations.

In one embodiment, the present disclosure provides a method of treating a wellbore penetrating a subterranean formation or a production flow line from the wellbore comprising: providing an asphaltene solvent and introducing the asphaltene solvent into the wellbore or production flow line.

In certain embodiments, the asphaltene solvent may be a dimethyl sulfide solution. In certain embodiments, the dimethyl sulfide solution may comprise at least 75 mol % of dimethyl sulfide. In other embodiments, the dimethyl sulfide solution may comprise at least 80 mol %, or at least 85 mol %, or at least 90 mol %, or at least 95 mol %, or at least 99 mol % dimethyl sulfide. In certain embodiments the asphaltene solvent may consist essentially of dimethyl sulfide or may consist of dimethyl sulfide.

In certain embodiments, the dimethyl sulfide solution may comprise one or more compounds that form a mixture with the dimethyl sulfide in the dimethyl sulfide solution. The one or more compounds may be compounds that form an azeotropic mixture with the dimethyl sulfide. Examples of compounds that may form an azeotropic mixture with dimethyl sulfide include pentane, isopentane, 2-methyl-2-butene, and isoprene. The asphaltene solvent, therefore, may be comprised of at least 75 mol % dimethyl sulfide and one or more compounds selected from the group consisting of pentane, isopentane, 2-methyl-2-butene, and isoprene.

In certain embodiments, the dimethyl sulfide solution may comprise one or more other compounds that do not form azeotropic mixtures with the dimethyl sulfide in the dimethyl sulfide solution and in which asphaltenes are soluble at temperatures within the range of temperatures within the wellbore or flow lines, or from −50° C. to 300° C. Examples of compounds that do not form azeotropic mixtures with the dimethyl sulfide include o-xylene, toluene, carbon disulfide, dichloromethane, trichloromethane, hydrogen sulfide, diesel, naphtha solvent, asphalt solvent, kerosene, and dimethyl ether.

In certain embodiments, the dimethyl sulfide solution may comprise a fluid that has a density greater than dimethyl sulfide. In certain embodiments, the fluid may have a density greater than the oil in the wellbore or production flow line. In certain embodiments, the fluid may be included in the dimethyl sulfide solution to enhance plug flow of the dimethyl sulfide solution through the wellbore or production flow line. The fluid may have a density of at least 0.9 g/cm$^3$ or at least 1.0 g/cm$^3$. Examples of suitable fluids include decant oil. In an embodiment, the asphaltene solvent provided for use in the method or system of the present invention may be comprised of up to 25 mol % decant oil.

In certain embodiments, the asphaltene solvent may be first contact miscible with liquid petroleum compositions, preferably any liquid petroleum composition. In liquid phase or in gas phase the solvent may be first contact miscible with substantially all crude oils including light crude oils, heavy crude oils, extra-heavy crude oils, and bitumen, and may be first contact miscible in liquid phase or in gas phase with the oil in the oil-bearing formation.

In certain embodiments, the asphaltene solvent may be first contact miscible with liquid phase asphaltenes in a hydrocarbonaceous composition. The asphaltene solvent may dissolve at least a portion of asphaltene deposits in a wellbore or production flow line including asphaltene sludges and solid asphaltene deposits. The asphaltene solvent may also be first contact miscible with $C_3$ to $C_8$ aliphatic and aromatic hydrocarbons containing less than 5 wt. % oxygen, less than 10 wt. % sulfur, and less than 5 wt. % nitrogen.

In certain embodiments, the asphaltene solvent may be first contact miscible with oil having a moderately high or a high viscosity. The asphaltene solvent may be first contact miscible with oil having a dynamic viscosity of at least 1000 mPa s (1000 cP), or at least 5000 mPa s (5000 cP), or at least 10000 mPa s (10000 cP), or at least 50000 mPa s (50000 cP), or at least 100000 mPa s (100000 cP), or at least 500000 mPa s (500000 cP) at 25° C. The asphaltene solvent may be first contact miscible with oil having a dynamic viscosity of from 1000 mPa s (1000 cP) to 5000000 mPa s (5000000 cP), or from 5000 mPa s (5000 cP) to 1000000 mPa s (1000000 cP), or from 10000 mPa s (10000 cP) to 500000 mPa s (500000 cP), or from 50000 mPa s (50000 cP) to 100000 mPa s (100000 cP) at 25° C.

In certain embodiments, the asphaltene solvent provided for use in the method or system of the present invention may have a low viscosity. The asphaltene solvent may be a fluid having a dynamic viscosity of at most 0.35 mPa s (0.35 cP), or at most 0.3 mPa s (0.3 cP), or at most 0.285 mPa s (0.285 cP) at a temperature of 25° C.

In certain embodiments, the asphaltene solvent provided for use in the method or system of the present invention may have a relatively high cohesive energy density. The asphaltene solvent provided for use in the method or system of the present invention may have a cohesive energy density of from 300 Pa to 410 Pa, or from 320 Pa to 400 Pa.

In certain embodiments, the asphaltene solvent provided for use in the method or system of the present invention preferably is relatively non-toxic or is non-toxic. The asphaltene solvent may have an aquatic toxicity of $LC_{50}$ (rainbow trout) greater than 200 mg/l at 96 hours. The asphaltene solvent may have an acute oral toxicity of $LD_{50}$ (mouse and rat) of from 535 mg/kg to 3700 mg/kg, an acute dermal toxicity of $LD_{50}$ (rabbit) of greater 5000 mg/kg, and an acute inhalation toxicity of $LC_{50}$ (rat) of 40250 ppm at 4 hours.

In certain embodiments, the wellbore may be a wellbore penetrating an oil bearing subterranean formation. In certain embodiments, the subterranean formation may be a subsea formation. In certain embodiments, the wellbore may be a barefoot wellbore. In other embodiments, the wellbore may be a cased wellbore with casing flow. In other embodiments, the wellbore may be a cased wellbore with tubing production strings with tubing flow.

In certain embodiments, the production flow line may be a production flow line from a wellbore. Examples of components that may be found in production flow lines include but are not limited to production pipes, flow control valves, safety valves, well head control valves, well head chokes, surface pumps, production and test manifolds, production and test separators, crude oil tanks, and production flow meters.

In certain embodiments, the production flow line may be a production flow line to a remote location or an offsite facility, such as a crude oil export pipeline used to deliver produced crude oil to processing locations and shipping terminals.

In certain embodiments, the asphaltene solvent may be introduced into the wellbore or production flow line by using any conventional means. Examples of conventional means include an asphaltene solvent storage facility, an injection pump, injection strings, tubing, pipes, in well flow control valves, well head control valves, and flow control and monitoring meters.

In certain embodiments, the asphaltene solvent may be introduced into the wellbore or production flow line before producing oil from the subterranean formation. In such embodiments, the asphaltene solvent may be introduced at a rate of 1 to 1000 barrels per day or 100 to 10,000 barrels per day or 1000 to 50,000 barrels per day to prepare the wellbore and production lines for production operations.

In certain embodiments, the asphaltene solvent may be introduced into the wellbore or production flow line after producing oil from the subterranean formation. In such embodiments, the asphaltene solvent may be introduced at a rate of 1 to 1000 barrels per day or 100 to 10,000 barrels per day or 1000 to 50,000 barrels per day to remediate the wellbore and production lines after a period of production operations.

In certain embodiments, the asphaltene solvent may be introduced into the wellbore or production flow line during the production of oil from the subterranean formation. In such embodiments, the asphaltene solvent may be introduced at a rate relative to oil production of 1 to 100,000 parts per million weight (ppm wt.) or 10 to 10,000 ppm wt. or 100 to 1,000 ppm wt. basis the oil production rate.

In certain embodiments, the wellbore or production flow line may comprise an asphaltene deposit. The asphaltene deposit may be comprised of a solid accumulation of asphaltenes that have deposited on surfaces within the wellbore or production flow line. The asphaltene deposit may be comprised of a sludge of asphaltenes that have settled out of the oil in the wellbore or production flow line. In certain embodiments, the asphaltene deposit may have resulted from producing oil from the formation by changing pressure, temperature, composition, and/or shear rate.

Referring now to FIG. 1, a system of the invention useful for practicing a process of the present invention is shown. An asphaltene solvent comprising at least 75 mol % dimethyl sulfide as described above is provided and stored in an asphaltene solvent storage facility 101. The asphaltene solvent storage facility 101 is operatively fluidly coupled to a wellbore 103 and/or a production flow line 107. The wellbore 103 extends into an oil-bearing formation 105. The production flow line 107 is operatively fluidly coupled to the wellbore 103. In certain embodiments, not illustrated, the asphaltene solvent storage facility 101 may be located on a sea floor.

The oil-bearing formation 105 may be a subterranean formation. The subterranean formation may be comprised of one or more porous matrix materials selected from the group consisting of a porous mineral matrix, a porous rock matrix, and a combination of a porous mineral matrix and a porous rock matrix, where the porous matrix material may be located beneath an overburden at a depth ranging from 50 meters to 6000 meters, or from 100 meters to 4000 meters, or from 200 meters to 2000 meters under the earth's surface. The formation may have a permeability of from 0.000001 to 15 Darcies, or from 0.001 to 1 Darcy. The rock and/or mineral porous matrix material of the formation may be comprised of sandstone, shale, and/or a carbonate selected from dolomite, limestone, and mixtures thereof—where the limestone may be microcrystalline or crystalline limestone and/or chalk. The subterranean formation may be a subsea subterranean formation.

One or more asphaltene deposits 109 may be located in the wellbore 103, production flow line 107, and/or production flow line 132. The asphaltene deposit 109 may impede fluid flow through the portion of the wellbore 103, production flow line 107, and/or production flow line 132 in which the deposit is located.

The system may be structured and arranged to introduce the asphaltene solvent into the wellbore 103 and/or production flow line 107 to contact the asphaltene deposits 109 therein. The system may be structured and arranged to introduce the asphaltene solvent into the wellbore 103 and/or production flow line 107 while producing oil from the oil-bearing formation 105. The wellbore 103 and/or production flow line 107 may be operatively fluidly coupled to the asphaltene solvent storage facility 101 through an injection/production facility 111. The asphaltene solvent storage facility 101 may be operatively fluidly coupled to the injection/production facility 111 via conduit 113 to provide asphaltene solvent to the injection/production facility. The injection/production facility 111 may be operatively fluidly coupled to the wellbore 103 and/or production flow line 107 to provide the asphaltene solvent to the wellbore and/or production flow line 107. In certain embodiments, not illustrated, the injection/production facility 111 may be located on a sea floor.

The injection/production facility 111 may include a mechanism for introducing the asphaltene solvent into the wellbore 103 and/or production flow line 107. The mechanism may be comprised of a pump 115. In one embodiment, the asphaltene solvent may be provided directly from the asphaltene solvent storage facility 101 to the pump 115 for introduction into the wellbore 103 or production flow line 107 in the absence of an injection/production facility 111.

The asphaltene solvent is introduced into the wellbore 103 and/or production flow line 107, for example by being injected into the wellbore 103 and/or production flow line 107 by pumping the asphaltene solvent into the wellbore 103 and/or production flow line 107. The asphaltene solvent may be introduced into the wellbore 103 and/or production flow line 107 at a pressure above the instantaneous pressure to the wellbore 103 and/or production flow line 107 to force the asphaltene solvent to flow into the wellbore 103 and/or production flow line 107. The pressure at which the asphaltene solvent is introduced into the wellbore 103 and/or production flow line 107 may range from the instantaneous pressure in the wellbore 103 and/or production flow line 107 up to, but not including, the fracture pressure of the formation 105. The pressure at which the asphaltene solvent may be injected into the wellbore 103 and/or production flow line 107 may range from 20% to 95%, or from 40% to 90%, of the fracture pressure of the formation 105. The pressure at which the asphaltene solvent may be injected into the wellbore 103 and/or production flow line 107 may range from a pressure from 0 to 37 MPa above the initial formation pressure, as measured prior to when the injection begins.

An amount of the asphaltene solvent may be introduced into the wellbore 103 and/or production flow line 107 to contact and dissolve at least a portion of an asphaltene deposit 109. Upon introduction into the wellbore 103 and/or production flow line 107, the asphaltene solvent may contact the asphaltene deposit 109. The asphaltenes of the asphaltene deposit 109 may be very soluble in the asphaltene solvent, where the asphaltenes may be first contact miscible with the asphaltene solvent. The asphaltene solvent may solvate and mobilize at least a portion, and preferably substantially all, of the asphaltenes in the asphaltene deposit upon contact with the asphaltene deposit.

The asphaltene solvent may be left to soak in the wellbore 103 and/or production flow line 107 after introduction into the formation to contact, solvate, and mobilize the asphaltenes in the asphaltene deposit 109. The asphaltene solvent may be contacted with asphaltene deposit for a sufficient period of time to solvate at least a portion, and preferably substantially all, of the asphaltenes of the asphaltene deposit, for example, at least 50 wt. %, or at least 75 wt. %, or at least 90 wt. % of the asphaltenes in the asphaltene deposit that are contacted by the asphaltene solvent. The asphaltene solvent may be left to soak in the wellbore 103 and/or production flow line 107 for a time period of from 1 hour to 15 days, or from 5 hours to 50 hours.

Subsequent to the introduction of the asphaltene solvent into the wellbore 103 and/or production flow line 107 and contact of the asphaltene solvent with the asphaltene deposit, a mixture of the asphaltene solvent and mobilized asphaltenes solvated by the solvent may be removed from the site of the (former) asphaltene deposit. The mixture of asphaltene solvent and mobilized asphaltenes may be removed from the site of the (former) asphaltene deposit by injecting further asphaltene solvent into the wellbore 103 and/or production flow line 107, or by injecting another fluid, for example water, into the wellbore 103 and/or production flow line 107, or by producing the mixture of asphaltene solvent and mobilized asphaltenes from the of wellbore 103 and/or production flow line 107.

The mixture of asphaltene solvent and mobilized asphaltenes may be recovered and produced from the wellbore 103 and/or production flow line 107. The system may include a mechanism for producing the mixture of asphaltene solvent and mobilized asphaltenes from the wellbore 103 and/or production flow line 107 subsequent to introduction of the asphaltene solvent, for example, after completion of introduction of the asphaltene solvent into the wellbore 103 and/or production flow line 107 and following the soak period. The mechanism for recovering and producing the mixture of asphaltene solvent and asphaltenes may be comprised of a pump 112, which may be located in the injection/production facility 111 and/or within the wellbore 103, and which draws the asphaltene solvent and the mixture of asphaltene solvent and mobilized asphaltenes from the wellbore 103 and/or production flow line 107 to deliver the asphaltene solvent and the mixture of asphaltene solvent and mobilized asphaltenes to the facility 111.

Alternatively, the mechanism for recovering and producing the mixture of asphaltene solvent and mobilized asphaltenes from the wellbore 103 and/or production flow line 107 may be comprised of a compressor 114. The compressor 114 may be operatively fluidly coupled to a gas storage tank 119 by conduit 121, and may compress gas from the gas storage tank for injection into the formation 105 through the wellbore 103. The compressor may compress the gas to a pressure sufficient to drive production of the mixture of asphaltene solvent and mobilized asphaltenes from the wellbore 103 and/or production flow line 107, where the appropriate pressure can be determined by conventional methods known to those skilled in the art.

Oil, and optionally gas and water, also may be mobilized and recovered from the formation 105 while recovering and producing the mixture of asphaltene solvent and mobilized asphaltenes from the wellbore 103 and/or production flow line 107. The mixture of asphaltene solvent and mobilized asphaltenes, and optionally oil, water, and gas may be produced back up the wellbore 103 to the injection/production facility 111. The produced mobilized asphaltenes, optionally together with produced oil, may be separated from the produced asphaltene solvent, and optionally produced water and gas, in a separation unit 125. The separation unit 125 may be comprised of a conventional flash or distillation column for separating the produced asphaltene solvent from the produced mobilized asphaltenes, and optionally produced oil and produced water. The separation unit may also be comprised of a conventional liquid-gas separator for separating produced gas from the produced mobilized asphaltenes and produced asphaltene solvent—and optionally produced oil and produced water, and a conventional water knockout vessel for separating the produced mobilized asphaltenes—and optionally produced oil—from produced water.

The separated produced asphaltenes, and optionally produced oil, may be provided from the separation unit 125 of the injection/production facility 111 to a liquid storage tank 127, which may be operatively fluidly coupled to the separation unit of the injection/production facility by conduit 129. The separated produced gas, if any, may be provided from the separation unit 125 of the injection/production facility 111 to the gas storage tank 119, which may be operatively fluidly coupled to the separation unit of the injection/production facility by conduit 131. The separated produced asphaltene solvent may be provided from the separation unit 125 of the injection/production facility 111 to the asphaltene solvent storage facility 101 via conduit 133. A production flow line 132 may be operatively coupled to liquid storage tank 127.

In certain embodiments, a floating product storage and offloading vessel (FPSO) may be used as a separation and recycle system to recover asphaltene solvent from produced fluids and return the asphaltene solvent to a storage facility for injection into the wellbore or production line.

To facilitate a better understanding of the present invention, the following examples of specific embodiments are given. In no way should the following examples be read to limit, or to define, the scope of the invention.

Example 1

The quality of dimethyl sulfide as an asphaltene solvent based on the miscibility of dimethyl sulfide with a crude oil relative to other compounds was evaluated.

drip rate control valve. Each oil sands sample was then extracted with a selected solvent at a selected temperature (10° C. or 30° C.) in a cyclic contact and drain experiment, where the contact time ranged from 15 to 60 minutes. Fresh contacting solvent was applied and the cyclic extraction repeated until the fluid drained from the apparatus became pale brown in color.

The extracted fluids were stripped of solvent using a rotary evaporator and thereafter vacuum dried to remove residual solvent. The recovered bitumen samples all had residual solvent present in the range of from 3 wt. % to 7 wt. %. The residual solids and extraction thimble were air dried, weighed, and then vacuum dried. Essentially no weight loss was observed upon vacuum drying the residual solids, indicating that the solids did not retain either extraction solvent or easily mobilized water. Collectively, the weight of the solid or sample and thimble recovered after extraction plus the quantity of bitumen recovered after extraction divided by the weight of the initial oil sands sample plus the thimble provide the mass closure for the extractions. The calculated percent mass closure of the samples was slightly high because the recovered bitumen values were not corrected for the 3 wt. % to 7 wt. % residual solvent. The extraction experiment results are summarized in Table 1.

TABLE 1

Summary of Extraction Experiments of Bituminous Oil Sands with Various Fluids

| Extraction Fluid | Temperature, C. | Input Solids weight, g | Output Solids weight, g | Weight Change, g | Recovered Bitumen, g | Experimental Weight Closure, % |
|---|---|---|---|---|---|---|
| Carbon Disulfide | 30 | 151.1 | 134.74 | 16.4 | 16.43 | 100.0 |
| Carbon Disulfide | 10 | 151.4 | 134.62 | 16.8 | 16.62 | 99.9 |
| Chloroform | 30 | 153.7 | 134.3 | 19.4 | 18.62 | 99.5 |
| Chloroform | 10 | 156.2 | 137.5 | 18.7 | 17.85 | 99.5 |
| Dichloromethane | 30 | 155.8 | 138.18 | 17.7 | 16.30 | 99.1 |
| Dichloromethane | 10 | 155.2 | 136.33 | 18.9 | 17.66 | 99.2 |
| o-Xylene | 30 | 156.1 | 136.58 | 19.5 | 17.37 | 98.6 |
| o-Xylene | 10 | 154.0 | 136.66 | 17.3 | 17.36 | 100.0 |
| Tetrahydrofuran | 30 | 154.7 | 136.73 | 18.0 | 17.67 | 99.8 |
| Tetrahydrofuran | 10 | 154.7 | 136.98 | 17.7 | 16.72 | 99.4 |
| Ethyl Acetate | 30 | 153.5 | 135.81 | 17.7 | 11.46 | 96.0 |
| Ethyl Acetate | 10 | 155.7 | 144.51 | 11.2 | 10.32 | 99.4 |
| Pentane | 30 | 154.0 | 139.11 | 14.9 | 13.49 | 99.1 |
| Pentane | 10 | 152.7 | 138.65 | 14.1 | 13.03 | 99.3 |
| Dimethyl Sulfide | 30 | 154.2 | 137.52 | 16.7 | 16.29 | 99.7 |
| Dimethyl Sulfide | 10 | 151.7 | 134.77 | 16.9 | 16.55 | 99.7 |

Figure 2:
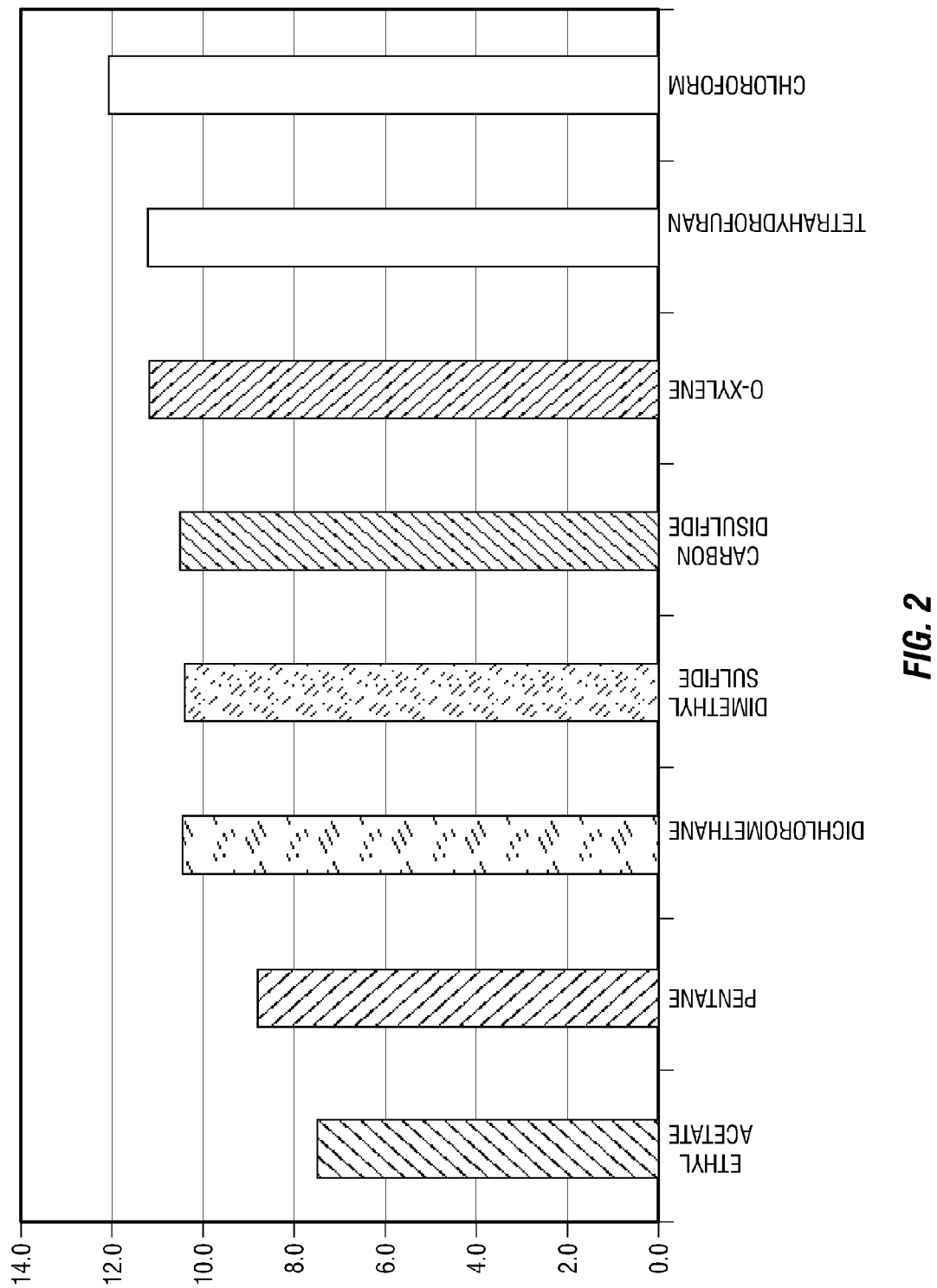
FIG. 2 is a graph showing petroleum recovery from oil sands at 30° C. using various solvents.
Figure 3:
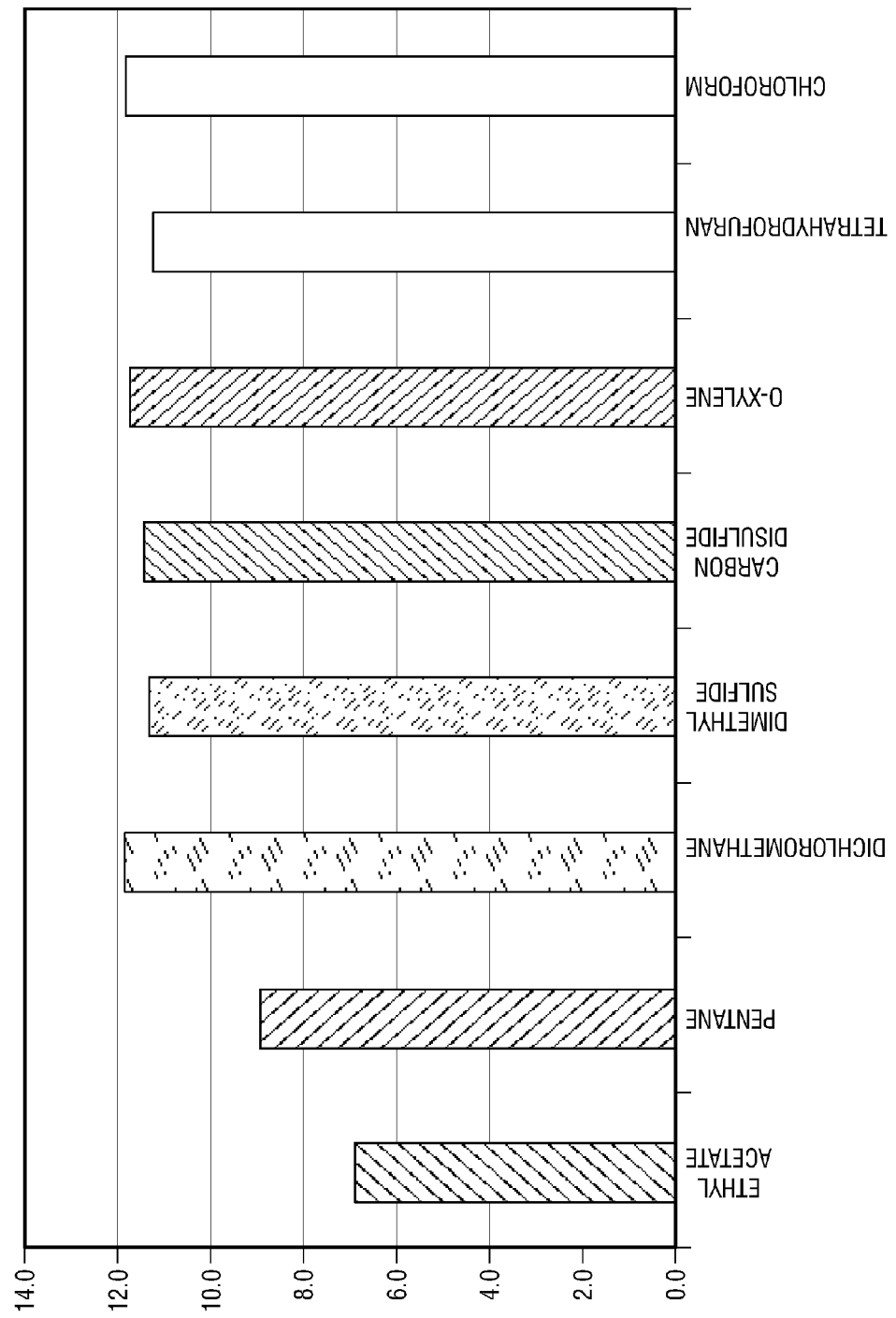
FIG. 3 is a graph showing petroleum recovery from oil sands at 10° C. using various solvents.

The miscibility of dimethyl sulfide, ethyl acetate, o-xylene, carbon disulfide, chloroform, dichloromethane, tetrahydrofuran, and pentane solvents with mined oil sands was measured by extracting the oil sands with the solvents at 10° C. and at 30° C. to determine the fraction of hydrocarbons extracted from the oil sands by the solvents. The bitumen content of the mined oil sands was measured at 11 wt. % as an average of bitumen extraction yield values for solvents known to effectively extract substantially all of bitumen from oil sands—in particular chloroform, dichloromethane, o-xylene, tetrahydrofuran, and carbon disulfide. One oil sands sample per solvent per extraction temperature was prepared for extraction, where the solvents used for extraction of the oil sands samples were dimethyl sulfide, ethyl acetate, o-xylene, carbon disulfide, chloroform, dichloromethane, tetrahydrofuran, and pentane. Each oil sands sample was weighed and placed in a cellulose extraction thimble that was placed on a porous polyethylene support disk in a jacketed glass cylinder with a FIG. 2 provides a graph plotting the weight percent yield of extracted bitumen as a function of the extraction fluid at 30° C. applied with a correction factor for residual extraction fluid in the recovered bitumen, and FIG. 3 provides a similar graph for extraction at 10° C. without a correction factor. FIGS. 2 and 3 and Table 1 show that dimethyl sulfide is comparable for recovering bitumen from an oil sand material with the best known fluids for recovering bitumen from an oil sand material—o-xylene, chloroform, carbon disulfide, dichloromethane, and tetrahydrofuran—and is significantly better than pentane and ethyl acetate.

The bitumen samples extracted at 30° C. from each oil sands sample were evaluated by SARA analysis to determine the saturates, aromatics, resins, and asphaltenes composition of the bitumen samples extracted by each solvent. The results are shown in Table 2.

TABLE 2

SARA Analysis of Extracted Bitumen Samples as a Function of Extraction Fluid

| Extraction Fluid | Oil Composition Normalized Weight Percent | | | |
|---|---|---|---|---|
| | Saturates | Aromatics | Resins | Asphaltenes |
| Ethyl Acetate | 21.30 | 53.72 | 22.92 | 2.05 |
| Pentane | 22.74 | 54.16 | 22.74 | 0.36 |
| Dichloromethane | 15.79 | 44.77 | 24.98 | 14.45 |
| Dimethyl Sulfide | 15.49 | 47.07 | 24.25 | 13.19 |
| Carbon Disulfide | 18.77 | 41.89 | 25.49 | 13.85 |
| o-Xylene | 17.37 | 46.39 | 22.28 | 13.96 |
| Tetrahydrofuran | 16.11 | 45.24 | 24.38 | 14.27 |
| Chloroform | 15.64 | 43.56 | 25.94 | 14.86 |

The SARA analysis showed that pentane and ethyl acetate were much less effective for extraction of asphaltenes from oil sands than are the known highly effective asphaltene extraction fluids dichloromethane, carbon disulfide, o-xylene, tetrahydrofuran, and chloroform. The SARA analysis also showed that dimethyl sulfide has excellent miscibility properties for even the most difficult hydrocarbons—asphaltenes.

The data showed that dimethyl sulfide is generally as good as the recognized very good asphaltene extraction fluids for removal of asphaltenes from oil sands. The data also show that DMS is highly compatible with all classes of crude oil hydrocarbons—saturates, aromatics, resins, and asphaltenes, and, therefore, is unlikely to induce phase instability in crude oil upon introduction into an oil-bearing formation.

Example 2

Two experiments were conducted on a naturally occurring tar mat material recovered from an oil-bearing formation to compare the rate of dissolution of the tar mat material using dimethyl sulfide and A150, a commercially available solvent comprised of a mixture of aromatic hydrocarbons that is commonly used to dissolve asphaltene deposits. A naturally occurring tar mat material recovered from an oil-bearing formation at a depth of 4690 meters and at a formation temperature of 50° C. was utilized as the tar mat material for the comparison. The tar mat material consisted essentially of asphaltenic hydrocarbons.

In the first experiment, two samples of DMS solvent and two samples of A150 solvent were individually mixed with the tar mat material at ambient temperature and pressure, where the volume (ml) to weight (g) ratio of each solvent sample to the tar mat material was approximately 100:1. The length of time required to entirely dissolve the tar mat material was measured and recorded. Table 3 below shows the results.

TABLE 3

Time Required for Dissolution of Tar Mat Material

| Sample # | Solvent | Weight of Tar Mat Material (g) | Volume of Solvent (ml) | Time Until Dissolution (h) |
|---|---|---|---|---|
| 1 | A150 | 1.07 | 100 | Between 8.00 and 22.00 (overnight) |
| 2 | A150 | 1.07 | 100 | Between 8:00 and 22:00 (overnight) |
| 1 | DMS | 1.07 | 100 | 4:00 |
| 2 | DMS | 1.07 | 100 | 4:00 |

In the second experiment, four samples of DMS solvent and four samples of A150 solvent were individually mixed with the tar mat material at ambient temperature and pressure, where the volume (ml) to weight (g) ratio of each solvent sample to the tar mat material was approximately 10:1. The length of time required to entirely dissolve the tar mat material was measured and recorded. Table 4 below shows the results.

TABLE 4

Time Required for Dissolution of Tar Mat Material

| Sample # | Solvent | Weight of Tar Mat Material (g) | Volume of Solvent (ml) | Time Until Dissolution (h) |
|---|---|---|---|---|
| 1 | A150 | 1.02 | 10 | Between 8.00 and 22.00 (overnight) |
| 2 | A150 | 1.00 | 10 | Between 8:00 and 22:00 (overnight) |
| 3 | A150 | 1.02 | 10 | Between 8:00 and 22:00 (overnight) |
| 4 | A150 | 1.02 | 10 | Between 8:00 and 22:00 (overnight) |
| 1 | DMS | 1.00 | 10 | 5:48 |
| 2 | DMS | 1.01 | 10 | 5:01 |
| 3 | DMS | 1.00 | 10 | 5:03 |
| 4 | DMS | 0.99 | 10 | 7:28 |

As shown by the results of each of the experiments, DMS dissolved the naturally occurring tar mat material at a higher rate than A150. In particular, DMS dissolved the naturally occurring tar mat material at a rate that was not less than 1.4 times faster than the A150 solvent. This data shows that DMS is an effective solvent for dissolving asphaltenic hydrocarbon materials, and that DMS dissolves asphaltenic hydrocarbon materials faster than A150, a commercially utilized solvent for dissolving asphaltene deposits.

While the embodiments are described with reference to various implementations and exploitations, it will be understood that these embodiments are illustrative and that the scope of the inventive subject matter is not limited to them. Many variations, modifications, additions and improvements are possible.

Plural instances may be provided for components, operations or structures described herein as a single instance. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

The present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. While systems and methods are described in terms of "comprising," "containing," or "including" various components or steps, the compositions and methods can also "consist essentially of" or "consist of" the various components and steps. Whenever a numerical range with a lower limit and an upper limit is disclosed, any number and any included range falling within the range is specifically disclosed. In particular, every range of values (of the form, "from a to b," or, equivalently, "from a-b") disclosed herein is to be understood to set forth every number and range encompassed within the broader range of values. Whenever a numerical range having a specific lower limit only, a specific upper limit only, or a specific upper limit and a specific lower limit is disclosed, the range also includes any numerical value "about" the specified lower limit and/or the specified upper limit. Also, the terms in the claims have their plain, ordinary meaning unless otherwise explicitly and clearly defined by the patentee. Moreover, the indefinite articles "a" or "an", as used in the claims, are defined herein to mean one or more than one of the element that it introduces.

What is claimed:

1. A method of treating a wellbore penetrating a subterranean formation comprising:
    providing an asphaltene solvent, wherein the asphaltene solvent comprises at least 75 mol % dimethyl sulfide;
    introducing the asphaltene solvent into the wellbore, wherein the wellbore contains one or more asphaltene deposits; and
    contacting the asphaltene solvent with one or more asphaltene deposits in the wellbore.

2. The method of claim 1, wherein the one or more asphaltene deposits comprise asphaltene accretions or sludges on a surface of the wellbore.

3. The method of claim 1, wherein the asphaltene solvent dissolves the one or more asphaltene deposits.

4. The method of claim 1, wherein the asphaltene solvent is first contact miscible with oil in or from the subterranean formation.

5. The method of claim 1, wherein the asphaltene solvent consists essentially of dimethyl sulfide.

6. The method of claim 1, wherein the asphaltene solvent further comprises up to 25 mol % decant oil.

7. The method of claim 1, further comprising producing oil from the subterranean formation simultaneously with introducing the asphaltene solvent into the wellbore.

8. A method of treating a production flow line from a wellbore penetrating a subterranean formation comprising:
    providing an asphaltene solvent, the asphaltene solvent comprising at least 75 mol % dimethyl sulfide;
    introducing the asphaltene solvent into the production flow line, wherein the production flow line contains one or more asphaltene deposits; and
    contacting the asphaltene solvent with one or more of the asphaltene deposits in the production flow line.

9. The method of claim 8, wherein the one or more asphaltene deposits comprise asphaltene accretions or sludges on a surface of the production flow line.

10. The method of claim 8, wherein the asphaltene solvent dissolves the one or more asphaltene deposits.

11. The method of claim 8, wherein the asphaltene solvent is first contact miscible with oil in or from the subterranean formation.

12. The method of claim 8, wherein the asphaltene solvent consists essentially of dimethyl sulfide.

13. The method of claim 8, wherein the asphaltene solvent further comprises up to 25 mol % decant oil.

14. The method of claim 8, further comprising producing oil from the subterranean formation simultaneously with introducing the asphaltene solvent into the production flow line.

15. A system for remediating asphaltene deposition comprising:
    an asphaltene solvent comprising at least 75 mol % dimethyl sulfide, which asphaltene solvent is first contact miscible with oil in or from the subterranean formation;
    an asphaltene solvent storage facility containing at least a portion of the asphaltene solvent; and
    a wellbore penetrating an oil-bearing formation, wherein the asphaltene solvent storage facility is operatively fluidly coupled to the wellbore or a production flow line from the wellbore.

16. The system of claim 15, wherein the system is structured and arranged to produce oil from the formation and the asphaltene solvent from the wellbore or production flow line.

* * * * *